United States Patent [19]

Bossi

[11] 4,106,632
[45] Aug. 15, 1978

[54] DEVICE FOR AUTOMATICALLY LOADING A MACHINE TOOL, PARTICULARLY A SHAVING MACHINE

[75] Inventor: Oscar G. Bossi, Milan, Italy

[73] Assignee: Societe dite: Stabilimento Industriale Costruzione Macchinario Attrezzature, Pianezza, Italy

[21] Appl. No.: 782,457

[22] Filed: Mar. 29, 1977

[30] Foreign Application Priority Data

Mar. 31, 1976 [FR] France .................... 76 09348

[51] Int. Cl.² ............................................. B23F 19/06
[52] U.S. Cl. ........................... 214/1 BB; 90/1.6 R; 198/341; 198/487; 214/8.5 K; 214/340
[58] Field of Search ............. 214/1 BB, 8.5 K, 1 PB, 214/340, DIG. 3; 198/339, 341, 344, 487; 51/215 CP, 215 H; 90/1.6 R

[56] References Cited

U.S. PATENT DOCUMENTS

| | | | |
|---|---|---|---|
| 3,572,520 | 3/1971 | Evans | 214/1 BB |
| 3,586,174 | 6/1971 | Hall | 214/1 BB |

Primary Examiner—Drayton E. Hoffman
Assistant Examiner—George F. Abraham
Attorney, Agent, or Firm—Lewis H. Eslinger

[57] ABSTRACT

Device for automatically loading a machine tool, particularly a shaving machine, comprising on the one hand a chute conveying the workpieces, particularly gears, to a loading station, on the other hand an equipment whose support is mobile in translation along a rectilinear slide by means of a double-acting hydraulic or pneumatic ram, said slide extending at least between the loading station and the work station of the machine tool. The mobile equipment comprises two units each comprising two arms, the two arms of the front, unloading unit as well as the front arm of the rear, loading unit, being mounted to pivot on the sliding support. A linkage connects the three pivotal arms and is coupled to a double-acting hydraulic or pneumatic ram, mounted on said support and ensuring the passage of the pivotal arms from a high position to a low position, and vice versa.

4 Claims, 4 Drawing Figures

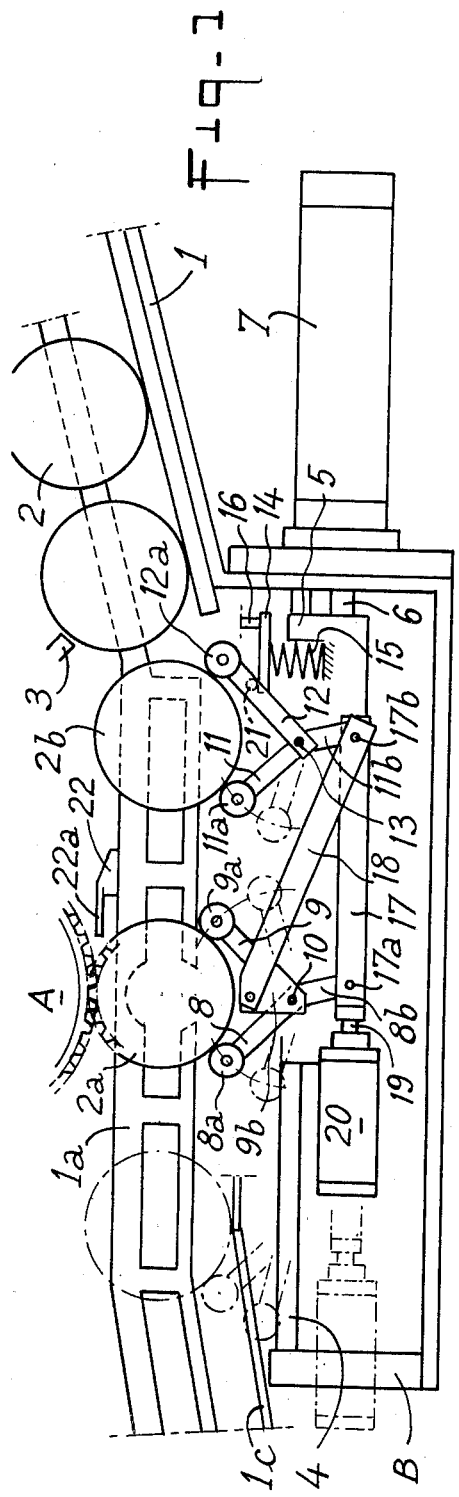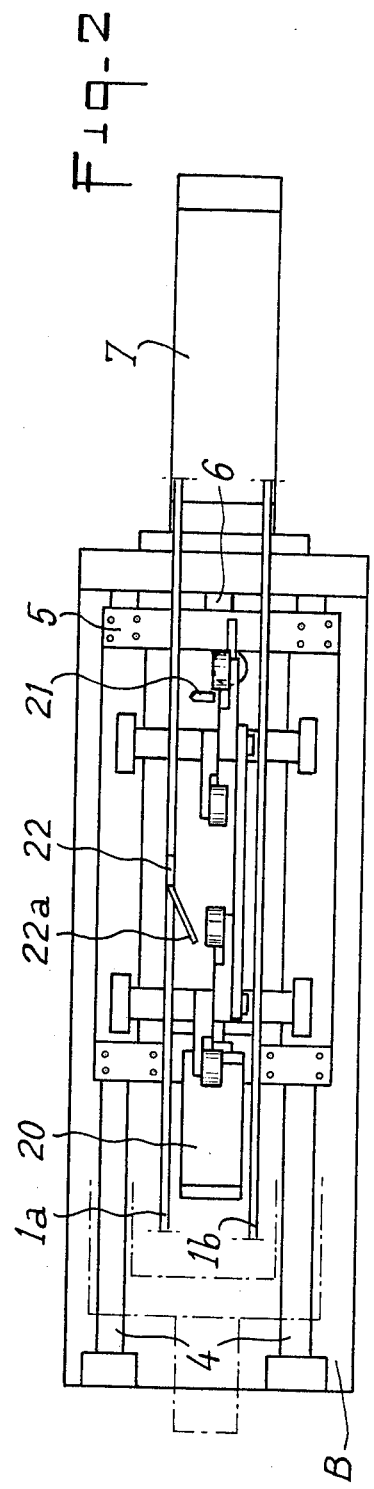

DEVICE FOR AUTOMATICALLY LOADING A MACHINE TOOL, PARTICULARLY A SHAVING MACHINE

BACKGROUND OF THE INVENTION

The present invention relates to a device for automatically loading a machine tool, particularly a shaving machine.

SUMMARY OF THE PRIOR ART

A number of automatic machine tools may be equipped with a device allowing the workpieces to be automatically loaded. In this way there is a saving of time and economy of man-power, as, at the same time, one operator may supervise several machines.

Such devices are known, particularly for automatic machines for shaving gears, but the unloading operations of a machined piece and the loading of a new workpiece are not concomitant. Furthermore, these operations frequently require that the machine, particularly the rotating tool, be temporarily set into action again. This causes time to be lost and it is an object of the invention to propose to eliminate this drawback.

SUMMARY OF THE INVENTION

To this end, the invention relates to a device for automatically loading a machine tool, particularly a shaving machine, comprising on the one hand a chute conveying the workpieces, particularly gears, to a loading station, on the other hand an equipment whose support is mobile in translation along a rectilinear slide by means of a double-acting hydraulic or pneumatic ram, said slide extending at least between the loading station and the work station of the machine tool. The mobile equipment comprises two units each comprising two arms, the two arms of the front, unloading unit as well as the front arm of the rear, loading unit, being mounted to pivot on the sliding support. A linkage connects the three pivotal arms and is coupled to a double-acting hydraulic or pneumatic ram mounted on said support and ensuring the passage of the pivotal arms from a high position to a low position and vice versa.

BRIEF SUMMARY OF THE DRAWINGS

FIG. 1 is a schematic view in elevation of a device according to the invention.

FIG. 2 is a plan view of the device according to FIG. 1;

DESCRIPTION OF THE PREFERRED EMBODIMENT

Figure 3:
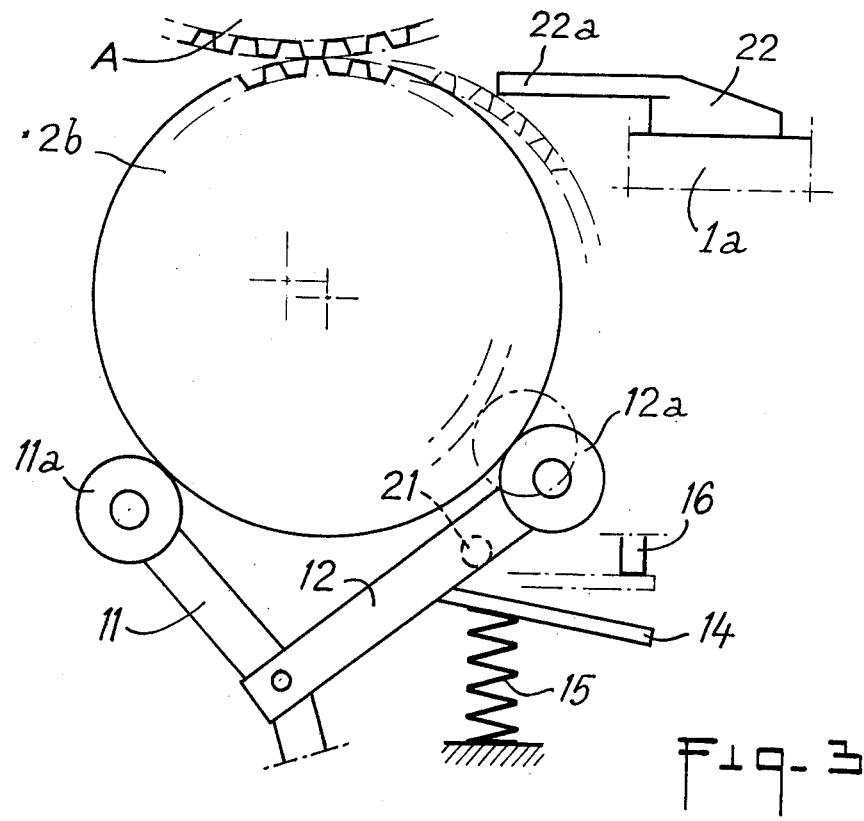
FIG. 3 is a detail, on a larger scale, of FIG. 1, during the loading operation.

Referring now to the drawings, the Figures show the device which comprises a chute 1 in which are stored the workpieces 2. In the case of loading of fragile pieces, such as gears, the chute 1 may be equipped with retractable members (not shown) which allow a workpiece to advance only after the preceding one has left its position, these members constituting on the other hand stops for each of the pieces, avoiding their banging one another. Of course, the chute also comprises, in its lower part, a retractable stop 3 for the piece intended to enter the loading device. This stop is released at an opportune moment, either directly by an apparatus (not shown) or by the return of the loading device into its position corresponding to the beginning of a loading cycle.

The chute 2 is integral with a frame B on which are also mounted the slides 4 of the support 5 of a mobile equipment which will be described hereinafter. The support 5 is coupled to the mobile member 6 of a hydraulic or pneumatic ram 7 whose body is fixed to the frame. The supply of the ram 7 depends on valves, for example of the electromagnetic type, controlled by the machine with which is associated the loading device, as well as by end-of-stroke contacts of the mobile member 6 of the ram. In general, the automatic machines are provided with a mechanical, electrical or electronic programmer and it is easy to connect the control of the valves supplying the ram 7 to the output circuit of said programmer.

The mobile equipment is essentially constituted by two units, each of two arms. The front unit (located to the left of the Figures) is designated unloading unit and is constituted by arms 8 and 9 mounted to pivot about a spindle 10 integral with support 5. The rear unit, designated loading unit, comprises two arms 11 and 12, the front arm 11 at least being mounted to pivot about a spindle 13 integral with support 5. In the example shown, the rear arm 12 is also mounted to pivot on axis 13; on the other hand, it comprises a finger 14 on which acts a spring 15, holding the arm 12 in its high position shown in solid lines in FIG. 1 and its finger 14 in abutment on a stop 16 integral with support 5. The four arms 8, 9, 11, 12 are provided at their free end with a roller 8a, 9a, 11a, 12a, on which a workpiece 2 or a piece which has already been machined may rest. Lateral guides 1a, 1b integral with the chute or the frame enable the pieces 2 to be maintained in the position shown in FIG. 1, when they rest on rollers. For a better understanding of FIG. 1, only guide 1a located to the rear of the plane of the Figure has been shown.

The three arms 8, 9 and 11 are kinematically connected by a linkage constituted by a first rod 17 on which are pivoted on the one hand extensions 8b and 11b of the arms 8 and 11, respectively on spindles 17a and 17b, on the other hand a second rod 18 coupled to the first on spindle 17b and coupled at its other end on a bent extension 9b of arm 9. For reasons which will be apparent hereinafter, the link 17 and the two extensions 8b and 11b advantageously constitute three sides of a deformable parallelogram, whilst in high position, shown in solid lines in the drawings, the arms 8 and 11, on the one hand, 9 and 12 on the other hand, are respectively parallel.

Finally, the rod 17 is coupled by one of its ends to the mobile member 19 of a double-acting hydraulic or pneumatic ram 20 mounted on the support 5. The pipes supplying the ram 20 are controlled, by means of valves, for example of the electromagnetic type, themselves depending on a programmer of the machine tool and end of stroke contacts of the mobile member of the ram 20.

Figure 4:
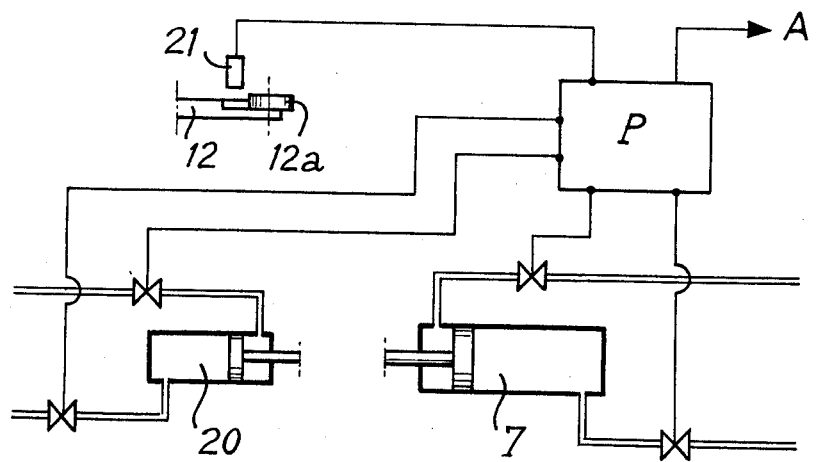
FIG. 4 is a diagram of the main control circuits of the machine and its loading device.

A complete description of the valve control circuits ensuring the supply of the rams 7 and 20 is not necessary for the man skilled in the art, as it will appear obvious on reading the description of the functioning which will be given hereinbelow. However, the main elements of these control circuits, assumed to be under the dependence of a single programmer P also ensuring the control of the machine tool, have been diagrammatrically shown in FIG. 4.

However, it should be emphasized that, in the retracted position of the ram 7, shown in solid lines, the arms 8 and 9 of the unloading unit are plumb with the work station A of the machine tool. In the example described, this station is essentially constituted by a shaving wheel A, whilst two tail stock centres (not shown) may be disengaged from the spindle of the piece 2a which has just been machined and which rests on the rollers 8a and 9a. Similarly, in the extended position of the ram 7, the loading unit 11-12 is plumb with the work station A and the tail stock centres may be engaged in the spindle of the workpiece 2b resting on rollers 11a and 12a.

On the support 5 is also mounted a detector 21 enabling the position of the arm 12 to be located and sensitive to a variation of this arm with respect to its high position shown in solid lines in FIG. 1. This detector is preferably a magnetic pick-up and may emit a signal when, under conditions which will be specified hereinbelow, the arm 12 pivots downwardly, compressing the spring 15. The signal emitted by the detector 21 is directed onto the programmer controlling the supply valves of the ram 7. When it is energized by the signal of the detector 21, this programmer controls a low amplitude to and fro movement of the ram 7 from its extended position shown schematically in FIG. 3.

In the vicinity of the position occupied by a piece 2, when it is plumb with the work station A, there is disposed a plate 22 fixed to the frame, for example to the lateral guide 1a. Its plane is preferably inclined with respect to the direction of the lateral guides and its end 22a, at least, is relatively flexible. This end 22a is so shaped that it is located near the peripheral edge of the piece 2a without, however, being in contact with said latter, i.e. with the teeth of the gear. The end 22a is on the other hand disposed between the machined piece 2a and the workpiece 2b, as may be seen in the drawings.

The functioning of the loading device is as follows:

In the position shown in solid lines in FIG. 1, the piece 2a has just been machined by tool A and the tailstock centres which supported it have been disengaged from its spindle. It therefore rests on rollers 8a and 9a and is held there by the lateral guides 1a and 1b. A workpiece 2b is located in the loading unit, carried by the rollers 11a and 12a.

The programmer P of the machine controls the opening of the valve supplying ram 7, thus causing said ram to extend and the support 5 of the mobile equipment to move along slides 4. The piece 2a is brought to the inlet of the inclined unloading chute 1c located to the left of FIG. 1, whilst the workpiece 2b arrives plumb with the work station A, the tool of which is then immobile.

In the example described, the pieces 2 are gears and the tool A is a shaving wheel whose periphery is consequently in the form corresponding to the shape of the teeth of the gears. The teeth of the piece 2b generally present themselves with respect to the teeth of the shaving wheel A so that they mesh with one another, the gear rolling on rollers 11a and 12a until the mobile equipment is immobilized in the position shown in broken lines in FIGS. 1 and 2 when the ram 7 is in its extended position.

An end of stroke contact of the ram 7 then controls the programmer of the machine which, in its turn, causes the displacement of the tail stock centres engaging in the spindle of the piece 2b. After execution of this movement, the programmer of the machine controls the opening of the supply valve of the ram 20, thus provoking the extension of said latter.

The arms 8, 9, 11 are then brought to their low position, shown in broken lines in FIG. 1 due to the linkage 17-18, and the machined piece 2a may move along the inclined unloading chute 1c. At the same time, the programmer or an end of stroke contact of the ram 20 controls the supply valve of ram 7, thus causing said latter to retract and the mobile equipment to move to the right, the support 5 taking up the position of FIG. 1 shown in solid lines again, the arms 8, 9 and 11 conserving, however, their low position. From the beginning of the retraction stroke of the ram 7, the programmer of the machine controls the machining cycle of the piece 2b, since the arms 8, 9 and 11 maintained in their low position do not hinder the development of this operation.

At the end of the machining cycle, the programmer of the machine controls the supply valve of the ram 20 in the sense of a retraction of said latter, this causing the arms 8, 9 and 11 to move towards their high position. As soon as this operation is terminated, the programmer or an end of stroke contact of ram 20 controls on the one hand the disengagement of the tail stocks which supported the piece 2b at the machining station, on the other hand the retraction of the retractable stop 3. The machined piece 2b then rests on rollers 8a-9a, whilst a new piece 2 descends the chute 1 to rest on rollers 11a-12a.

A new loading and unloading cycle may then be produced under the same conditions as those which have just been described. It should be noted that the cycle described is very short since the operations of unloading the machined piece 2a and loading the workpiece 2b are simultaneous and are obtained by a single stroke of the support 5 towards the left.

However, it is necessary to indicate the arrangements making it possible to remedy a difficulty which may occur at the end of the extension stroke of the ram 7 towards the left. It has been indicated above that the teeth of the piece 2b in the course of loading and those of the tool A generally mesh with one another at the moment when the piece 2b arrives plumb with tool A. In certain cases, however, the teeth of the piece 2b are opposite the teeth of tool A, this preventing the piece 2b from being suitably positioned beneath tool A.

As is clearly seen in FIG. 3, the piece 2b then pushes the arm 12 downwardly against the action of spring 15. In this way, any deterioration of the teeth of the piece and of the tool is avoided. The detector 21, noting that the arm 12 has left its normal position of abutment on the stop 16, emits a signal ensuring the control of the supply valves of the ram 7, so that said latter makes a low amplitude reciprocal movement, from its extended position, the piece 2b then moving between the positions shown in solid lines and in broken lines in FIG. 3. In the course of the return movement, a tooth of the piece 2b meets the end 22a of the plate 22 constituting a stop. The piece 2b therefore rotates through a small angle about its axis, rolling on rollers 11a and 12a. When the ram 7 takes its extended position again, the piece 2b may present itself correctly with respect to the tool A and its teeth will mesh with those of the tool, as shown in FIG. 1. The cycle then continues as described hereinabove.

What is claimed is:

1. A device for automatically loading a machine tool, particularly a shaving machine, comprising on the one hand a chute conveying the workpieces, particularly gears, to a loading station, on the other hand an equipment whose support is mobile in translation along a rectilinear slide by means of a double-acting hydraulic or pneumatic ram, said slide extending at least between the loading station and the work station of the machine tool, whilst the mobile equipment comprises two units each comprising two arms, each unit of two arms being adapted to support a workpiece and the two arms of the front, unloading unit as well as the front arm of the rear, loading unit, being mounted to pivot on the sliding support, wherein the ends of the arms of the mobile equipment are provided with rotating rollers on which rest the workpieces, whilst a linkage connects the three pivotal arms and is coupled to a double-acting hydraulic or pneumatic ram mounted on said support and ensuring the passage of the pivotal arms from a high position to a low position and vice versa.

2. The device as defined in claim 1, wherein the rear arm of the rear unit is also mounted to pivot on the sliding support and is normally maintained in its high position against a stop by means of a spring, whilst there is provided, near the position occupied by said rear arm, a detector carried by the sliding support and sensitive to a downward deviation of said rear arm.

3. The device as defined in claim 2, wherein the detector is a magnetic pick-up.

4. The device as defined in claim 2, wherein the detector is connected to a relay controlling the ram driving the mobile equipment in a low amplitude reciprocating cycle, whilst there is provided, near the work station, a stop that may come into contact, in the course of the return movement of the mobile equipment, with the workpiece carried by the loading arm unit.

* * * * *